United States Patent
Geyer

(10) Patent No.: US 8,261,899 B2
(45) Date of Patent: Sep. 11, 2012

(54) SHIFTING COLLAR APPARATUS AND METHOD FOR REDUCING THE FORCE REQUIRED FOR DISENGAGING A FIXED HOLDING FEATURE

(75) Inventor: Allan Ernest Geyer, Marion, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 645 days.

(21) Appl. No.: 12/497,311

(22) Filed: Jul. 2, 2009

(65) Prior Publication Data

US 2011/0011695 A1 Jan. 20, 2011

(51) Int. Cl.
*F16D 11/04* (2006.01)
(52) U.S. Cl. .................................... 192/69.91
(58) Field of Classification Search .............. 74/335, 74/362, 366, 369; 192/48.91, 69.91, 110 B
See application file for complete search history.

(56) References Cited

U.S. PATENT DOCUMENTS

| | | | | |
|---|---|---|---|---|
| 2,535,388 | A * | 12/1950 | Burks et al. ............. | 192/48.91 |
| 4,966,267 | A * | 10/1990 | Carlton ..................... | 192/48.91 |
| 4,981,459 | A | 1/1991 | Klinkenberg | |
| 6,257,081 | B1 | 7/2001 | Gagnon et al. | |
| 6,343,993 | B1 * | 2/2002 | Duval et al. ............. | 464/167 |
| 6,439,072 | B1 * | 8/2002 | Kajita et al. ............. | 74/89.23 |
| 6,520,305 | B2 | 2/2003 | Dick | |
| 6,648,093 | B2 | 11/2003 | Rioux et al. | |
| 6,691,815 | B2 | 2/2004 | Rioux et al. | |
| 6,716,129 | B2 | 4/2004 | Bott et al. | |
| 6,725,987 | B2 | 4/2004 | Koga | |
| 6,835,158 | B2 | 12/2004 | Sugiura et al. | |
| 6,856,880 | B2 | 2/2005 | Shimaguchi | |
| 6,942,386 | B2 * | 9/2005 | Weissflog ................ | 384/47 |
| 7,018,299 | B2 * | 3/2006 | da Silva .................. | 464/167 |
| 7,311,016 | B2 | 12/2007 | Busch | |
| 7,406,888 | B2 * | 8/2008 | Busch et al. ............ | 74/335 |

OTHER PUBLICATIONS

BikeBandit.com; http://www/bikebandit.com/assets/schematics/Honda/H01890029.gif.

* cited by examiner

*Primary Examiner* — David D Le
*Assistant Examiner* — David J Hlavka
(74) *Attorney, Agent, or Firm* — Marshall & Melhorn LLC

(57) ABSTRACT

The present invention is an apparatus and method of using the apparatus to disengage a shifting collar from a fixed holding feature with reduced force regardless of whether the vehicle is positioned on an inclined or a declined slope.

20 Claims, 4 Drawing Sheets

SHIFTING COLLAR APPARATUS AND METHOD FOR REDUCING THE FORCE REQUIRED FOR DISENGAGING A FIXED HOLDING FEATURE

BACKGROUND OF THE INVENTION

Various devices for transferring power in a vehicle transmission are known to those skilled in the art. One such device is a shifting collar utilized as part of a collar shift transmission. Collar shift transmissions utilize the shifting collar to engage various gears. In some collar shift transmissions, a pair of lever arms are utilized to allow a vehicle operator to manually select or change a gear.

Typically, the first lever arm is located in a console next to the vehicle operator. The second lever arm is connected to a yoke which is connected to the shifting collar. The first lever arm is connected to the second lever arm by, for example, a cable. Thus, in order to disengage or engage a gear the vehicle operator must apply a force to the first lever arm. The force is transmitted through the connector to the second lever arm which transmits the force to the yoke and to the shifting collar which then moves the shifting collar along a clutch shaft. An example of the collar shift transmission assembly described above and compatible with the present invention can be found in U.S. Pat. No. 7,406,888, the disclosure of which is hereby incorporated by reference.

The amount of force required to select a gear using a lever arm is determined by a variety of factors. Factors include the type of engagement between the shifting collar and a presently selected gear, the frictional forces between the shifting collar and the clutch shaft, and any torque the weight of the vehicle provides. Any or all of these factors can effect the amount of force a vehicle operator must provide to select a gear.

Those skilled in the art have attempted to reduce the amount and the variability of the force required to select a gear in collar shift transmissions. However, the prior art systems are complex and expensive. It would thus be desirable to provide an economic shifting collar apparatus which reduces the amount of force required to select a gear. It would also be desirable to provide a shifting collar apparatus which requires only the same amount of force to select a gear regardless of the position of the vehicle.

SUMMARY OF THE INVENTION

In accordance with the present invention, a shifting collar apparatus for a collar shift transmission is provided. In an embodiment, the present invention includes a shaft having a first end portion, a center portion, and a second end portion. Within the center portion of the shaft is a plurality of grooves. The present invention also includes a shifting collar. The shifting collar has an inner periphery and an outer periphery. The center portion of the shaft extends through the shifting collar inner periphery. Further, a cage member is provided. The cage member is positioned between the clutch shaft center portion and the shifting collar inner periphery. The cage member has an inner portion, an outer portion, and a plurality of apertures which extend from the inner portion to the outer portion. A biasing member is also provided. The biasing member is positioned between the shaft and the shifting collar and contacts at least the cage member.

In another embodiment, the present invention comprises a method for reducing the force required to disengage a shifting collar from a fixed holding feature. The method comprises providing a shifting collar apparatus comprising a cage member, a clutch shaft, and a shifting collar. The shifting collar is selectively engaged with a fixed holding feature of a vehicle. Utilizing a biasing member, the shifting collar apparatus cage member is biased along a clutch shaft opposite the position of the fixed holding feature. The biasing member is disposed within an inner periphery of the shifting collar. The method further comprises disengaging the shifting collar from the fixed holding feature to transmit torque through the shifting collar to the clutch shaft. The clutch shaft extends through the shifting collar and has a plurality of axially extending grooves. The method also comprises rolling a plurality of spheres within the clutch shaft grooves and within a plurality of grooves on the inner periphery of the shifting collar in a direction opposite the fixed holding feature. The plurality of spheres are disposed within the cage member so that they do not contact each other.

BRIEF DESCRIPTION OF THE SEVERAL VIEWS OF THE DRAWING

The above, as well as other advantages of the present invention, will become readily apparent to those skilled in the art from the following detailed description when considered in light of the accompanying drawings in which.

DETAILED DESCRIPTION OF THE INVENTION

It is to be understood that the invention may assume various alternative orientations and step sequences, except where expressly specified to the contrary. It is also to be understood that the specific apparatus and methods described in the following specification are simply exemplary embodiments of the inventive concepts defined in the appended claims. Hence, specific dimensions, directions, flow rates, or other physical characteristics relating to the embodiments disclosed are not to be considered as limiting, unless the claims expressly state otherwise. Additionally, although the invention will be described in connection with a collar shift transmission, it would be understood by one of ordinary skill in the art that the apparatus and method described herein has applications to any torque transferring system where a shifting collar can be engaged and disengaged from a gear and/or a fixed holding feature.

Figure 1:
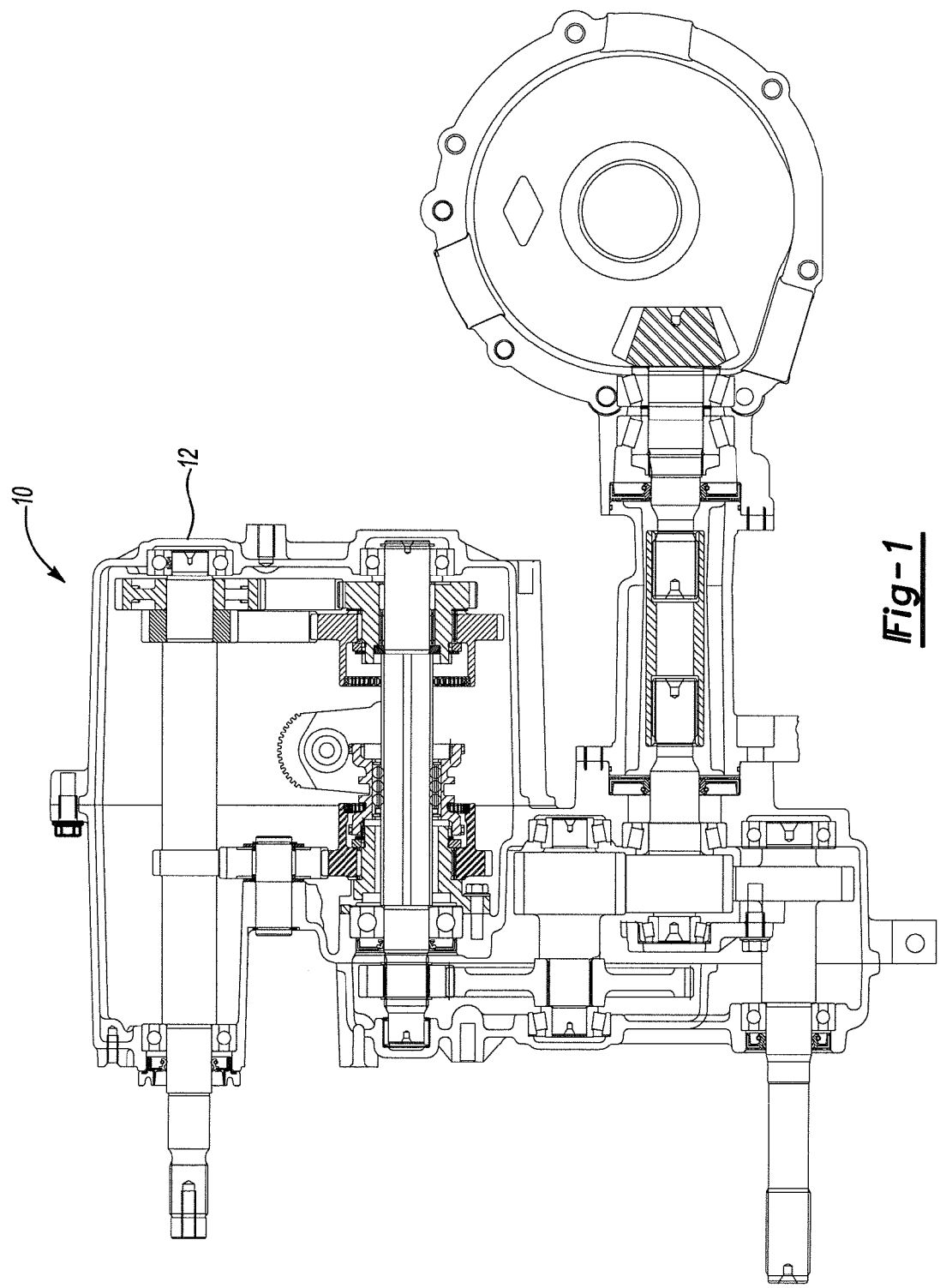
FIG. 1 is a schematic side view of an embodiment of a transmission assembly.

Referring now to FIG. 1, a transmission assembly 10 is depicted. The assembly 10 is substantially located within a housing 12. The housing 12 may be one-piece or it may be comprised of multiple pieces joined together, as known by those skilled in the art.

Figure 2:
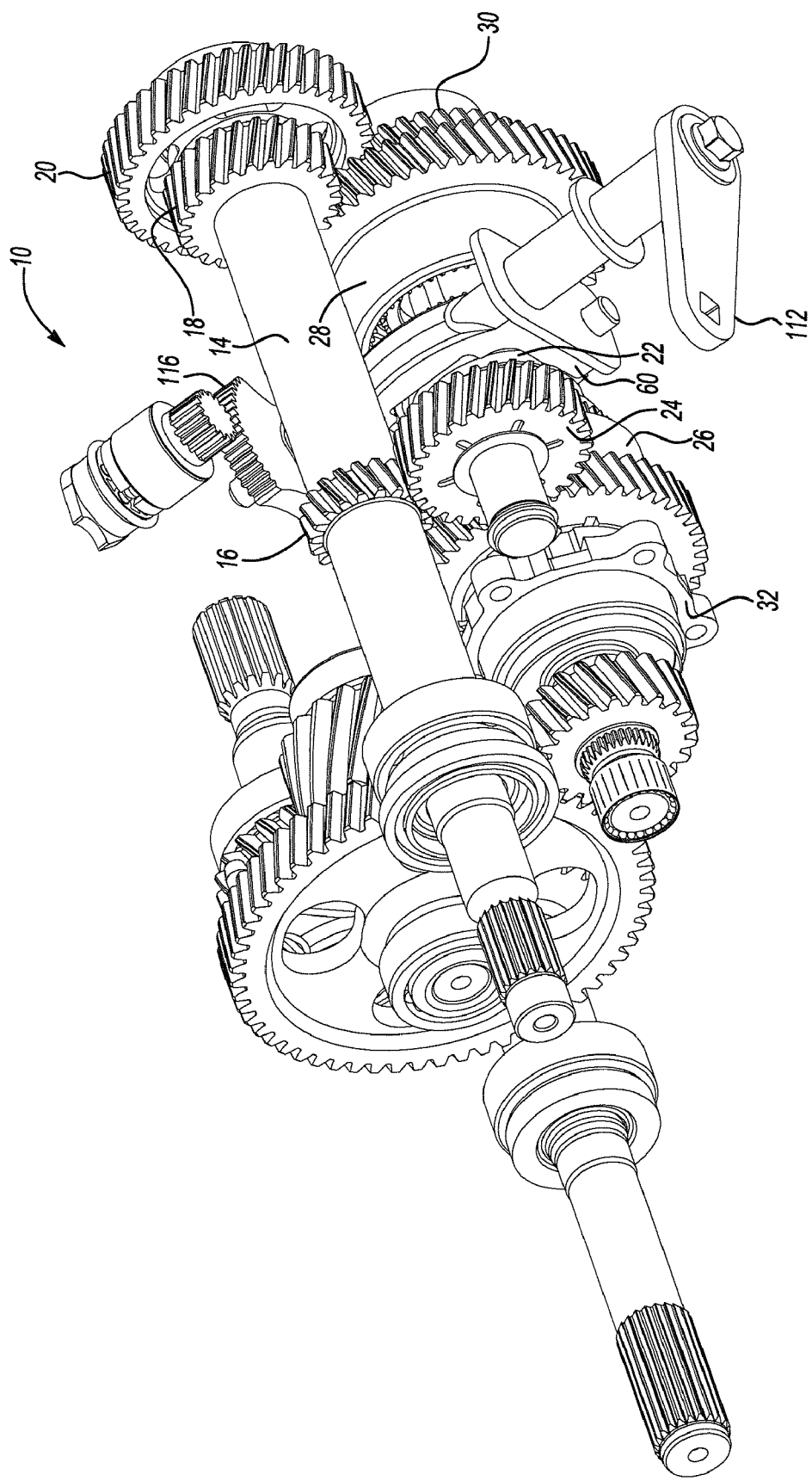
FIG. 2 is a schematic perspective view of some of the components of the transmission assembly depicted in FIG. 1 and the shifting collar apparatus of the present invention.

Referring now to FIG. 2, the transmission assembly 10 comprises an input pinion shaft 14, a reverse pinion 16, a first forward pinion 18, a second forward pinion 20, and a shifting collar apparatus 22. One skilled in the art would appreciate that additional forward and reverse pinions can be located on the input pinion shaft 14 without affecting the scope of the present invention.

The reverse pinion 16 is drivingly connected to a reverse idler gear 24. The reverse idler gear 24 is drivingly connected to a reverse shell gear 26. The first forward pinion 18 is drivingly connected to a forward shell gear 28 and the second forward pinion 20 is drivingly connected to a forward gear 30. The transmission assembly 10 also comprises a park feature via a park flange 32. The reverse shell gear 26, the forward shell gear 28, the forward gear 30, and the park flange 32 may have jaw teeth or spline teeth for engaging the shifting collar apparatus 22.

Figure 3:
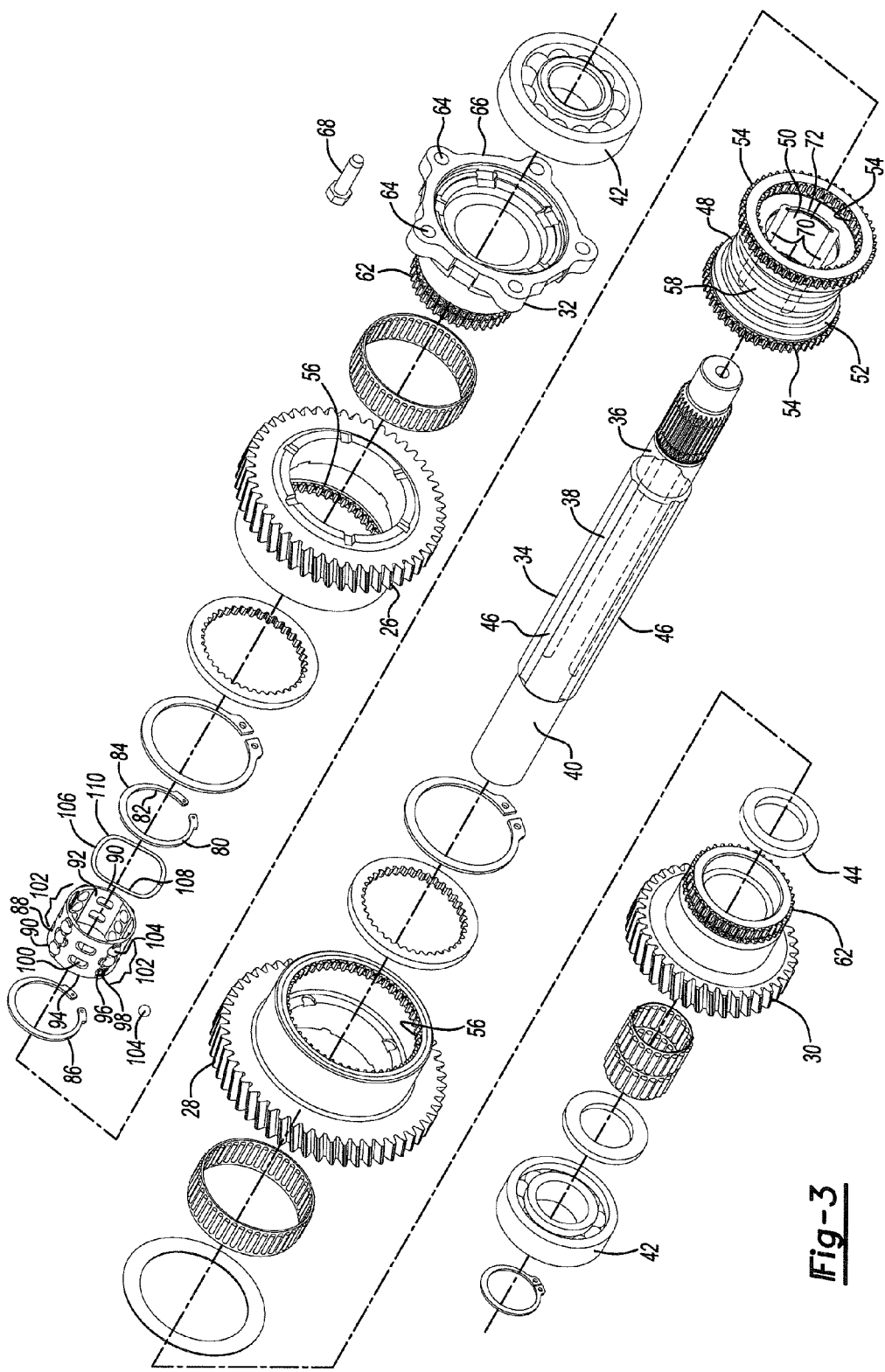
FIG. 3 is an exploded perspective view of the shifting collar apparatus.

Referring now to FIG. 3, the shifting collar apparatus 22 comprises a rotatable clutch shaft 34. The clutch shaft 34 comprises a first end portion 36, a center portion 38, and a second end portion 40. The clutch shaft 34 may be constructed of a metal or a polymer. The clutch shaft 34 may be rotatably supported by bearings 42 on each end portion 36, 40. The clutch shaft first end portion 36 supports the reverse shell gear 26. The clutch shaft second end portion 40 rotatably supports the forward shell gear 28 and the forward gear 30.

A shoulder member 44 may be attached to the second end portion 40. The shoulder member 44 provides a spacer for positioning the clutch shaft 34 in the forward shell gear 28 and the forward gear 30. In an embodiment, the shoulder member 44 may be a thrust washer. In another embodiment, the shoulder member 44 is attached to the second end portion 40 directly adjacent the center portion 38. It is also within the scope of the present invention for either end portion 36, 40 of the clutch shaft 34 to be splined. Those skilled in the art would appreciate that the clutch shaft end portions 36, 40 may not be splined but could instead may have no end portion connector or have another end portion connector such as a key or press fit connection.

The clutch shaft center portion 38 may have a plurality of concave grooves 46. It is preferred that the concave grooves 46 extend axially along the clutch shaft center portion 38. The concave grooves 46 may also be equally spaced apart radially on the clutch shaft center portion 38. In an embodiment, the clutch shaft center portion 38 has four concave grooves 46 which extend over its entire length. One skilled in the art would appreciate that the present invention may be practiced with more than or less than four concave grooves 46 on the clutch shaft center portion 38.

Figure 4:
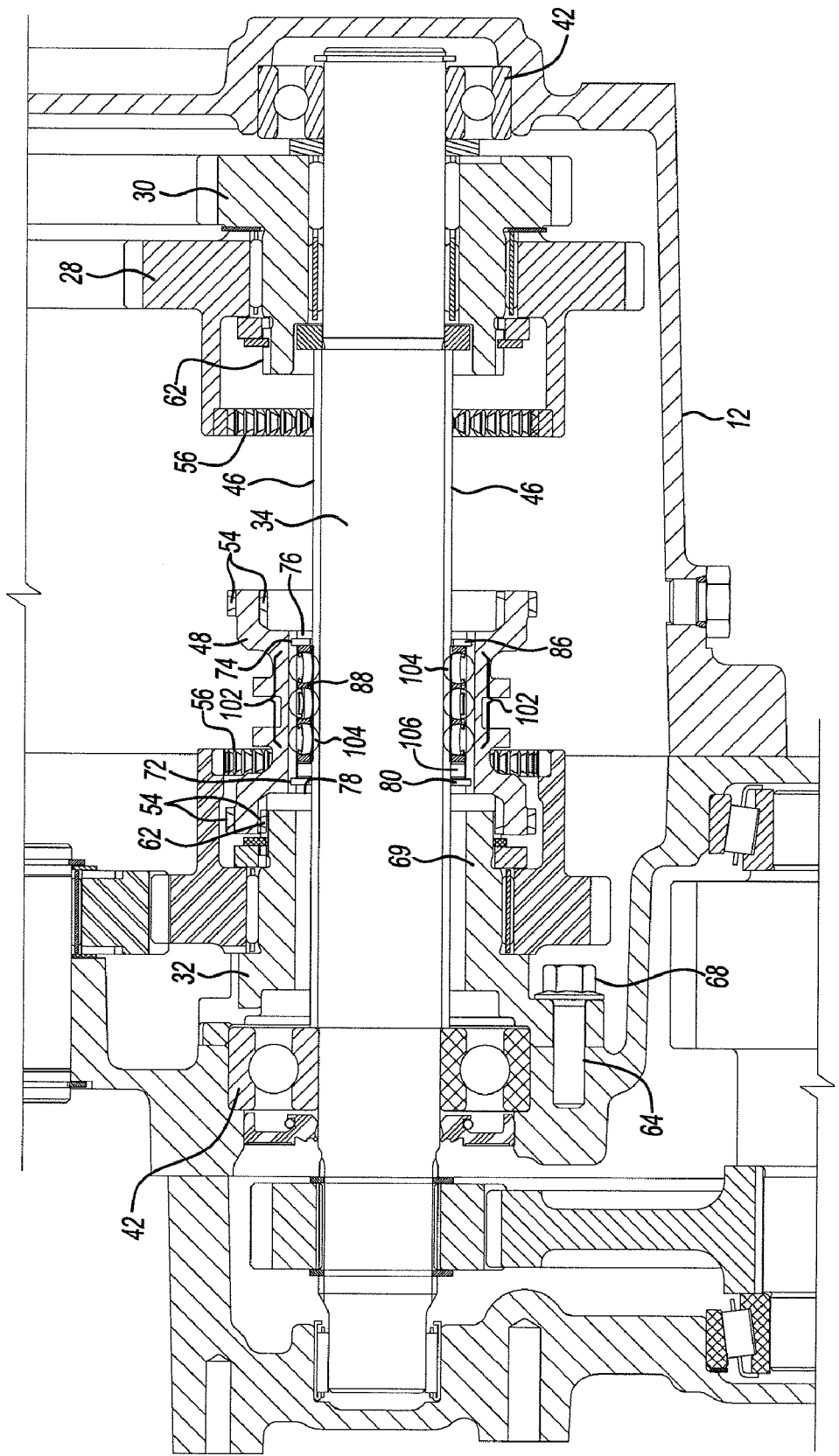
FIG. 4 is a cross-sectional view of the shifting collar apparatus.

Referring now to FIGS. 3 and 4, the shifting collar apparatus 22 further comprises a shifting collar 48. The shifting collar 48 may be moved axially along the clutch shaft 34. Moving the shifting collar 48 axially along the clutch shaft 34 allows the shifting collar 48 to engage various gears in the transmission assembly 10. The shifting collar 48 may be constructed from a metal or a polymer.

The shifting collar 48 preferably has an inner periphery 50 and an outer periphery 52. The clutch shaft center portion 38 extends through the shifting collar inner periphery 50. On the shifting collar inner periphery 50 and/or the outer periphery 52 a plurality of sets of teeth 54 may be located for engaging the reverse shell gear 26, the forward shell gear 28, the forward gear 30, the park flange 32. Those skilled in the art would appreciate that while spline teeth are shown on the shifting collar inner periphery 50 and the outer periphery 52 in FIG. 3, it is within the scope of the present invention to use jaw teeth instead of the spline teeth.

The teeth 54 on the shifting collar outer periphery 52 may engage complimentary teeth 56 on the reverse shell gear 26 and the forward shell gear 28. The shifting collar outer periphery 52 also preferably has at least one clutch groove 58 located thereon. The clutch groove 58 extends continuously about the shifting collar 48. As shown in FIG. 2, the shifting collar clutch groove 58 may receive a clutch yoke 60. Typically, the clutch yoke 60 comprises either blades (not shown) or a rib (not shown) which engage the clutch groove 58. The shifting collar 48 may rotate relative to the clutch yoke 60.

Since the clutch groove 58 is continuous about the shifting collar 48, the clutch groove 58 provides an engagement surface for the shifting collar 48 and the blades or the rib of the clutch yoke 60 regardless of the orientation of the shifting collar 48.

Referring back now to FIGS. 3 and 4, the teeth 54 on the shifting collar inner periphery 50 may engage complimentary teeth 62 located on either the forward gear 30 or the park flange 32. The park flange 32 is located about the clutch shaft first end portion 36. The park flange 32 is stationary with respect to the reverse shell gear 26 and the clutch shaft 34 because it is fixed to the housing 12 and does not rotate or is stationary. The park flange 32 comprises a plurality of apertures 64 which are spaced about the perimeter 66 of the flange 32. The apertures 64 each accept a mechanical fastener 68 that is secured to the housing 12 to fix the park flange 32. When the shifting collar 48 is engaged with the park flange 32, the shifting collar 48 and thus the clutch shaft 34 are not permitted to rotate. Those skilled in the art would appreciate that the present invention is not limited to engaging and disengaging a shifting collar 48 from only the park flange 32. Rather, the present is also applicable to disengaging a shifting collar 48 from a fixed holding feature 69. An example of the fixed holding feature 69 compatible with the present invention can be found in U.S. Pat. No. 7,311,016, the disclosure of which is hereby incorporated by reference.

In an embodiment, the shifting collar inner periphery 50 may have a plurality of concave shifting grooves 70 which extend axially along the inner periphery 50. The shifting grooves 70 may be equally spaced apart radially on the shifting collar inner periphery 50. The shifting grooves 70 may correspond in number to and have equal radiuses with the clutch shaft center portion concave grooves 46. The shifting grooves 70 may also be radially aligned with the clutch shaft concave grooves 46. As shown in the embodiment depicted in FIG. 3, the shifting collar inner periphery 50 has four axially extending shifting grooves 70 which mirror the four clutch shaft center portion concave grooves 46.

In another embodiment, the shifting collar inner periphery 50 has at least one support groove 72 which radially extends about the inner periphery 50. In yet another embodiment, the at least one support groove 72 comprises a first support groove 72 and a second support groove 74 which radially extend about the shifting collar inner periphery 50. In this embodiment, the first support groove 72 may be located at a forward portion 76 of the shifting collar inner periphery 50 and the second support groove 74 may be located at a rearward portion 78 of the shifting collar inner periphery 50. In both embodiments, the at least one support groove 72 extends continuously about the shifting collar inner periphery 50.

At least one support structure 80 may be located within the at least one support groove 72. The at least one support structure 80 may have an inner diameter 82 and an outer diameter 84. However, the at least one support structure 80 need not engage the at least one support groove 72 in its entirety. The at least one support structure outer diameter 84 may be disposed within the at least one support groove 72. The support structure inner diameter 82 may be provided such that the clutch shaft center portion 38 can rotate therein and extend therethrough. In an embodiment, the at least one support structure 80 comprises a first support structure 80 and a second support structure 86. In an embodiment, the first support structure 80 and the second support structure 86 are snap rings. In another embodiment, the first support structure 80 and the second support structure 86 are retaining rings.

Additionally, the shifting collar apparatus 22 may comprise a cage member 88 positioned between the clutch shaft center portion 38 and the shifting collar inner periphery 50. The cage member 88 may be positioned between the first support structure 80 and the second support structure 86 to limit the axial movement of the cage member 88 with respect to the shifting collar 48 when the shifting collar 48 moves along the clutch shaft 34 or the clutch shaft 34 rotates. The cage member 88 may be constructed of a metal or a polymer.

The cage member 88 comprises end portions 90, an inboard portion 92, an outboard portion 94, and a plurality of apertures 96. The plurality of apertures 96 extend from the inboard portion 92 to the outboard portion 94 and each may have a diameter surrounded by a wall 98. It is preferable that the diameter is uniform. However, one skilled in the art would appreciate that an aperture 96 need not have a uniform diameter to practice the present invention. It is also preferable that the plurality of apertures' diameters are the same, however this is not necessary to practice the present invention. Thus, the diameters of the plurality of apertures 96 may vary. For instance, an aperture 96 used to transmit torque from the shifting collar 48 to the clutch shaft 34 may have a diameter which is different from an aperture 100 formed in the cage member 88 to reduce the weight of the cage member 88.

In an embodiment, the plurality of apertures 96 are aligned into one of at least two axial extending columns 102. The diameters of the plurality of apertures 96 may vary depending on which axial column 102 an aperture 96 is aligned into. As shown in FIG. 2, there may be four axial columns 102 in which the plurality of apertures 96 may be aligned into. Those skilled in the art would appreciate that more than four axial columns 96 are also possible for use with the present invention.

In another embodiment, a sphere 104 may be disposed within any of the plurality of apertures 96. Therefore, the present invention may comprise a plurality of spheres 104. Each of the plurality of spheres 104 is disposed in only one aperture 96 of the cage member plurality of apertures 96. Thus, the cage member 88 provides spacing between each sphere 104 so that the plurality of spheres 104 are not permitted to contact each other. Each sphere 104 in the plurality of spheres 104 has a diameter. In an embodiment, the diameter of each sphere 104 in the plurality of spheres 104 is preferably ¼". However, one skilled in the art would appreciate that the present invention is not limited by the diameter of the plurality of spheres 104. Thus, in practicing the present invention it is possible that the plurality of spheres 104 may have a diameter smaller than ¼" or a diameter larger than ¼". The plurality of spheres 104 may be made of a polymer but preferably the spheres 104 are made from a metal.

The plurality of apertures 96 which the plurality of spheres 104 are disposed in may have a diameter which is slightly larger than the diameter of the sphere 104 which is disposed within it. This allows each of the plurality of spheres 104 to be positioned within an aperture 96 and allows the sphere 104 to rotate therein. When the shifting collar apparatus 22 is assembled and integrated into the transmission assembly 10, the plurality of spheres 104 partially contacts and are disposed within the clutch shaft center portion concave grooves 46 and the shifting collar inner periphery shifting grooves 70. The connection between the plurality of spheres 104 with the shifting collar inner periphery 50 and clutch shaft center portion 34 allows torque to be transferred from the shifting collar 48 to the clutch shaft 34.

The cage member 88 is contacted on an end portion 90 by a biasing member 106. While the biasing member 106 may contact either cage member end portion 90, it is preferable that the biasing member 106 contact the end portion 90 nearest the park flange 32 or the fixed holding feature 69. In an embodiment, the biasing member 106 may be positioned between the cage member 88 and the at least one support structure 80. In another embodiment, the biasing member 106 may have an inner diameter 108 and an outer diameter 110 for being positioned about the clutch shaft 34 and within the shifting collar inner periphery 50.

Due to torque provided by vehicle weight acting on the transmission assembly, the biasing member 106 may provide an axial force against the cage member 88 when a vehicle is not on a level slope, particularly when at least a front portion of the vehicle is positioned on a declined slope. Thus, in an embodiment the biasing member 106 may be a spring or a washer. Also, while the embodiment shown in FIG. 3 depicts the biasing member 106 as a wave spring, the biasing member 106 may be a coil spring. In another embodiment, the biasing member 106 may be constructed of a material, such as an elastomeric material, which provides an axial force when it is compressed.

As shown in FIGS. 2-4, when the shifting collar apparatus 22 is assembled the clutch shaft 34, the shifting collar 48, the cage member 88, and the biasing member 106 may be concentric. In operation, the present invention provides a method for reducing the force required to disengage the shifting collar 48 from a selected gear or the fixed holding feature 69. The method of the present invention may be practiced as a feature of a collar shift transmission assembly or as part of a vehicle assembly.

As shown in FIG. 2, a lever arm 112 is connected to the clutch yoke 58 which is connected to the shifting collar apparatus 22. As can be appreciated from the foregoing, when a vehicle operator wants to select a gear or park or disengage a gear or park, the lever arm 112 must be rotated to a predetermined location. The vehicle operator may be provided with a physical indication of his selection by virtue of a gear selection detent (not shown) engaging with a depression in a gear selection detent plate 116 corresponding to the gear desired or park.

FIG. 4 illustrates the shifting collar apparatus 22 engaged with the fixed holding feature 69. The method for disengaging the shifting collar apparatus 22 from the fixed holding feature 69 comprises providing the shifting collar 48 in selective engagement with the fixed holding feature 69. The cage member 88 may be biased by the biasing member 106 along the clutch shaft 34 in a direction opposite the position of the fixed holding feature 69. In order to bias the cage member 88, the biasing member 106 may provide an axial force against the cage member 88. This is particularly effective when the vehicle is not on a level slope, more particularly, when the front portion or nose of the vehicle is positioned on a declined slope, the clutch shaft 34 is oriented along the vehicle's center line, and the fixed holding feature 69 is proximate the front portion of the vehicle.

In practice the axial force provided by the biasing member 106 acts against an end portion 90 of the cage member 88. The axial force biases the cage member 88, and specifically the aperture wall 98, against each of the plurality of spheres 104 disposed within each plurality of apertures 96. Biasing the cage member 88 and the plurality of spheres 104 allows the plurality of spheres 104 to roll in a direction opposite the fixed holding feature 69 when the nose of the vehicle is positioned on a declined slope and the fixed holding feature 69 is disengaged. Each of the plurality of spheres 104 rolls within an aperture 96 of the cage member plurality of apertures 96. One skilled in the art would appreciate that the plurality of spheres 104 need only to roll until the fixed holding feature 69 is disengaged.

Thus, the method also comprises disengaging the shifting collar 48 from the fixed holding feature 69. Once disengaged, the shifting collar 48 can be engaged with a gear to transmit torque through the shifting collar 48 to the clutch shaft 34.

As will be seen in the Examples, below, the method of the present invention is particularly useful when a portion of the vehicle assembly is on an inclined slope or a declined slope. As illustrated in the Examples, biasing the plurality of spheres 104 when the shifting collar 48 is disengaged with the fixed holding feature 69 prevents the plurality of spheres 104 from sliding within the clutch shaft plurality of concave grooves 46 and within the shifting collar inner periphery plurality of shifting grooves 70. If the plurality of spheres 104 were to slide, the amount of force required to disengage the shifting collar from the fixed holding feature 69 would increased. Furthermore, sliding would also result in an increase in the force required to disengage the shifting collar 22 from the fixed holding feature 69 when the nose of the vehicle was on a declined slope as compared to when the nose of the vehicle was on an inclined slope.

EXAMPLES

Table 1 shows the amount of lever force required to disengage a shifting collar from a stationary flange using the shifting collar apparatus known in the art (Examples 1 and 3) versus the shifting collar apparatus 22 and method of the present invention (Examples 2 and 4). The percentage reduction in the force required for disengagement is also shown. In Examples 1 and 3, the shifting collar was moved along the clutch shaft via a splined connection having twenty-five teeth. Examples 2 and 4 utilized the shifting collar apparatus 22 of the present invention which comprises the cage member 88, the biasing member 106, and the plurality of spheres 104 to move the shifting collar 48 along the clutch shaft 34.

All of the force measurements were recorded at the vehicle console shifting lever using a seventeen degree slope and a stationary flange as the fixed holding feature 69. In Examples 1 and 2, the nose of the vehicle was pointed up the slope. In Examples 3 and 4, the nose of the vehicle was pointed down the slope.

TABLE 1

Force Required to Disengage a Shifting Collar from a Stationary Flange

| Example | FORCE | FORCE REDUCTION % |
|---|---|---|
| 1 | 93.3 | 53.2 |
| 2 | 43.7 | |
| 3 | 108.7 | 57.1 |
| 4 | 46.7 | |

Note:
Force is expressed in units of lbs.

As shown in Table 1, Examples 2 and 4, the present invention reduces the amount of force required to disengage a shifting collar from a fixed holding feature. The present invention also ensures that the amount of force required to disengage the shifting collar from a fixed holding feature is essentially the same whether the nose of the vehicle is position on an inclined or a declined slope. Regardless of the slope, the shifting collar apparatus 22 and method of the present invention provides an average reduction in the amount of force required to disengage park by over 50%.

Thus, the present invention provides a transmission assembly 10 comprising a shifting collar apparatus 22 which reduces the friction between a shifting collar 48 and a clutch shaft 34. More particularly, the present invention provides a transmission assembly 10 which requires less force to disengage a fixed holding feature than the prior art devices. Even more particularly, this invention provides a shifting collar apparatus 22 which requires only an equal amount of force to disengage a vehicle's fixed holding feature regardless of whether a vehicle is positioned on an inclined slope or a declined slope.

The invention has been disclosed in what is considered to be its preferred embodiment. It must be understood, however, the specific embodiments are provided only for the purpose of illustration, and that the invention may be practiced otherwise than as specifically illustrated without departing from its spirit and scope.

What I claim is:

1. A shifting collar apparatus, comprising:
    a clutch shaft comprising a first end portion, a center portion, and a second end portion, wherein a plurality of grooves are located in the center portion;
    a shifting collar having an inner periphery and an outer periphery, wherein the center portion of the clutch shaft extends through the shifting collar inner periphery;
    a cage member positioned between the shaft center portion and the shifting collar inner periphery, the cage member comprising an inner portion, an outer portion, and a plurality of apertures extending from the inner portion to the outer portion; and
    an axially biasing member positioned between the clutch shaft and the shifting collar, the axially biasing member contacting at least the cage member.

2. The shifting collar apparatus defined in claim 1, wherein the clutch shaft center portion plurality of grooves extend axially and the shifting collar further comprises a plurality of grooves located on the inner periphery which are radially aligned with the center portion plurality of grooves.

3. The shifting collar apparatus defined in claim 1, wherein the clutch shaft center portion plurality of grooves extend over the entire length of the center portion.

4. The shifting collar apparatus defined in claim 1, wherein at least one of the clutch shaft end portions is splined.

5. The shifting collar apparatus defined in claim 1, wherein the shifting collar further comprises a plurality of sets of teeth on its inner periphery, at least one set of teeth on its outer periphery, and at least one continuous radial groove on its outer periphery.

6. The shifting collar apparatus defined in claim 1, wherein each of the cage member plurality of apertures is aligned in one of at least two axial columns.

7. The shifting collar apparatus defined in claim 1, further comprising a plurality of spheres, wherein each of the plurality of spheres is disposed in an aperture of the cage member plurality of apertures and wherein each of the plurality of spheres contacts the clutch shaft center portion and the shifting collar inner periphery.

8. The shifting collar apparatus defined in claim 1, wherein the axially biasing member is a spring, a washer, or is elastomeric.

9. The shifting collar apparatus defined in claim 1, wherein the axially biasing member is a wave spring.

10. The shifting collar apparatus defined in claim 1, wherein the axially biasing member has an inner diameter and an outer diameter.

11. The shifting collar apparatus defined in claim 1, further comprising at least one support structure located within the shifting collar.

12. The shifting collar apparatus defined in claim 1, wherein the shifting collar inner periphery has a plurality of support grooves which extend radially and continuously about the inner periphery.

13. The shifting collar apparatus defined in claim 7, wherein the plurality of spheres are disposed within the apertures so that the spheres can rotate therein.

14. The shifting collar apparatus defined in claim 6, wherein the at least two axial columns is equal in number to the plurality of clutch shaft center portion grooves.

15. The shifting collar apparatus defined in claim 11, further comprising a first support structure and a second support structure wherein the first support structure contacts the axially biasing member, the second support structure contacts the cage member, and both the first support structure and the second support structure are snap rings.

16. A shifting collar apparatus, comprising:
   a clutch shaft comprising a first end portion, a center portion, and a second end portion, wherein a plurality of grooves are located in the center portion;
   a shifting collar having an inner periphery and an outer periphery, wherein the inner periphery has a plurality of grooves which are radially aligned with the clutch shaft center portion plurality of grooves and wherein the clutch shaft center portion extends through the shifting collar inner periphery;
   a cage member positioned between the clutch shaft center portion and the shifting collar inner periphery, the cage member comprising an inner portion, an outer portion, and a plurality of apertures extending from the inner portion to the outer portion;
   a plurality of spheres, wherein each of the plurality of spheres is disposed in an aperture of the cage member plurality of apertures and wherein each of the plurality of spheres contacts the clutch shaft center portion plurality of grooves and the shifting collar inner periphery plurality of grooves; and
   an axially biasing member positioned between the clutch shaft and the shifting collar, the axially biasing member contacting at least the cage member
   wherein the clutch shaft, the shifting collar, the cage member, and the biasing member are concentric.

17. A method for reducing the force required to disengage a shifting collar from a fixed holding feature, comprising:
   providing a shifting collar apparatus comprising a cage member, a clutch shaft, and a shifting collar, wherein the shifting collar is selectively engaged with a fixed holding feature of a vehicle;
   axially biasing the shifting collar apparatus cage member along the clutch shaft opposite the position of the fixed holding feature with a biasing member, wherein the biasing member is disposed within an inner periphery of the shifting collar;
   disengaging the shifting collar from the fixed holding feature to transmit torque through the shifting collar to the clutch shaft, wherein the clutch shaft extends through the shifting collar and has a plurality of axially extending grooves; and
   rolling a plurality of spheres within the clutch shaft grooves and within a plurality of grooves on the shifting collar inner periphery in a direction opposite the fixed holding feature, wherein the plurality of spheres are disposed within the cage member so that they do not contact each other.

18. The method of claim 17, wherein a force applied by the biasing member is such that when the shifting collar is disengaged with the fixed holding feature each of the plurality of spheres roll within an aperture formed in a cage member.

19. The method defined in claim 17, wherein a force applied by the biasing member acts against an end portion of the cage member.

20. The method of claim 18, wherein the biasing member is a spring positioned between the cage member and a support structure.

* * * * *